(12) United States Patent
Park et al.

(10) Patent No.: US 8,055,640 B2
(45) Date of Patent: Nov. 8, 2011

(54) SYSTEM AND METHOD FOR TRANSMITTING MULTIMEDIA CONTENTS

(75) Inventors: Sun Woo Park, Pyeongtaek-Si (KR);
Young Hun Kim, Pyeongtaek-Si (KR);
In-Won Kang, Pyeongtaek-Si (KR);
Taeyong Park, Pyeongtaek-Si (KR);
Sungtack Byun, Pyeongtaek-Si (KR)

(73) Assignee: LG Electronics Inc., Seoul (KR)

( * ) Notice: Subject to any disclaimer, the term of this patent is extended or adjusted under 35 U.S.C. 154(b) by 517 days.

(21) Appl. No.: 11/946,545

(22) Filed: Nov. 28, 2007

(65) Prior Publication Data

US 2009/0013001 A1 Jan. 8, 2009

(30) Foreign Application Priority Data

Jul. 2, 2007 (KR) .................. 10-2007-0066255
Jul. 3, 2007 (KR) .................. 10-2007-0066295

(51) Int. Cl.
*G06F 17/30* (2006.01)
(52) U.S. Cl. ........ 707/706; 707/770; 707/771; 707/913; 707/915; 707/920; 707/922
(58) Field of Classification Search .................. 707/706, 707/770, 771, 899, 913, 915, 920, 922
See application file for complete search history.

(56) References Cited

U.S. PATENT DOCUMENTS

| | | | | |
|---|---|---|---|---|
| 7,191,212 B2* | 3/2007 | Hirai | | 709/203 |
| 7,203,751 B2* | 4/2007 | Yasushi et al. | | 709/225 |
| 7,451,177 B1* | 11/2008 | Johnson et al. | | 709/203 |
| 7,533,061 B1* | 5/2009 | Cheng et al. | | 705/50 |
| 7,565,175 B2* | 7/2009 | Pell et al. | | 455/566 |
| 7,603,683 B2* | 10/2009 | Reto | | 725/34 |
| 7,900,818 B2* | 3/2011 | Espelien | | 235/375 |
| 2002/0046258 A1* | 4/2002 | Yasushi et al. | | 709/218 |
| 2005/0124317 A1* | 6/2005 | Kaplan | | 455/411 |
| 2005/0233742 A1* | 10/2005 | Karaoguz et al. | | 455/432.3 |
| 2006/0015826 A1* | 1/2006 | Shiozawa et al. | | 715/864 |
| 2006/0025108 A1* | 2/2006 | Pell et al. | | 455/405 |
| 2006/0025151 A1* | 2/2006 | Karaoguz et al. | | 455/455 |
| 2006/0258289 A1* | 11/2006 | Dua | | 455/41.3 |
| 2007/0038935 A1* | 2/2007 | Hull et al. | | 715/706 |
| 2007/0091855 A1* | 4/2007 | Karaoguz et al. | | 370/338 |
| 2007/0156747 A1* | 7/2007 | Samuelson | | 707/102 |
| 2007/0282907 A1* | 12/2007 | Chambers | | 707/104.1 |
| 2008/0009268 A1* | 1/2008 | Ramer et al. | | 455/412.1 |
| 2008/0021741 A1* | 1/2008 | Holla et al. | | 705/3 |
| 2009/0005087 A1* | 1/2009 | Lunati et al. | | 455/466 |
| 2009/0268712 A1* | 10/2009 | Bottiero et al. | | 370/352 |
| 2010/0138293 A1* | 6/2010 | Ramer et al. | | 705/14.46 |
| 2010/0217663 A1* | 8/2010 | Ramer et al. | | 705/14.42 |

* cited by examiner

*Primary Examiner* — Thanh-Ha Dang
(74) *Attorney, Agent, or Firm* — Birch, Stewart, Kolasch & Birch, LLP

(57) ABSTRACT

A method of communicating on a mobile communication terminal. The method includes inputting category information identifying a category of contents, providing a list of content information on a server corresponding to the input category information, wherein a content information indicates a portion of a content that the mobile communication terminal can connect to, selecting at least one of the list of content information, and connecting to the content corresponding to said at least one of the selected content information.

23 Claims, 6 Drawing Sheets

SYSTEM AND METHOD FOR TRANSMITTING MULTIMEDIA CONTENTS

CROSS-REFERENCE TO RELATED APPLICATIONS

The present application claims priority under 35 U.S.C. 119 and 35 U.S.C. 365 to Korean Patent Application No. 10-2007-0066255 filed on Jul. 2, 2007 and No. 10-2007-0066295 filed on Jul. 3, 2007, both of which are hereby incorporated by reference in their entirety.

BACKGROUND OF THE INVENTION

1. Field of the Invention

The present invention relates to a system and a method for transmitting/receiving multimedia contents to and from a mobile communication terminal.

2. Description of the Related Art

Mobile terminal now include a variety of additional functions besides the basic call function. For example, user can access the Internet, transfer and receive multimedia files, play videos and music, send and receive text and voice messages, perform scheduling tasks, etc. using their mobile communication terminal.

In addition, the amount of menu options on the mobile terminal have also increased to allow the user to perform the variety of different functions on the mobile terminal. For example, the user can select a main menu option and then select an Internet menu option to access the Internet and view or download multimedia contents. For example, the user can download music files by accessing the Internet and searching for a particular Internet option.

Mobile communication terminal also include high quality digital cameras that the user can use to take still or moving pictures. The user can also transfer any captured images to another mobile terminal. Thus, users can share photographs or short movies they have taken using their mobile terminal. The user created content is stored on a user's home page or another Internet site such as YOUTUBE. The user created content is often referred to as UCC (user created contents) or UGC (user generated contents).

Further, other users can access and view the UCC or UGC via the Internet. However, the users must manually search for a particular content such as a video by manually entering a search phrase. This is often cumbersome and time-consuming.

SUMMARY OF THE INVENTION

Accordingly, one object of the present invention is to address the above-noted and other problems.

Another object of the present invention is to provide a mobile communication terminal that allows a user to easily view or download multimedia contents stored on a multimedia server.

Yet another object of the present invention is to provide a mobile communication terminal that is automatically notified about any multimedia contents that have been updated or changed since a last viewing of the multimedia contents.

Still another object of the present invention is to allow a user to set or change characteristics of a mobile terminal used in accessing multimedia contents.

To achieve these and other advantages and in accordance with the purpose of the present invention, as embodied and broadly described herein, the present invention provides in one aspect a method of communicating on a mobile communication terminal. The method includes inputting category information identifying a category of contents, providing a list of content information on a server corresponding to the input category information, wherein a content information indicates a portion of a content that the mobile communication terminal can connect to, selecting at least one of the list of content information, and connecting to the content corresponding to said at least one of the selected content information.

In another aspect, the present invention provides a mobile communication terminal including an input unit configured to input category information identify a category of contents, a transmitting unit configured to transmit the input category information to a server, a receiving unit configured to receive a list of content information on the server corresponding to the input category information, wherein a content information indicates a portion of a content that the mobile communication terminal can connect to, and an output unit configured to output content corresponding to a selected one of the content information. The present invention also provides a corresponding mobile communication system.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
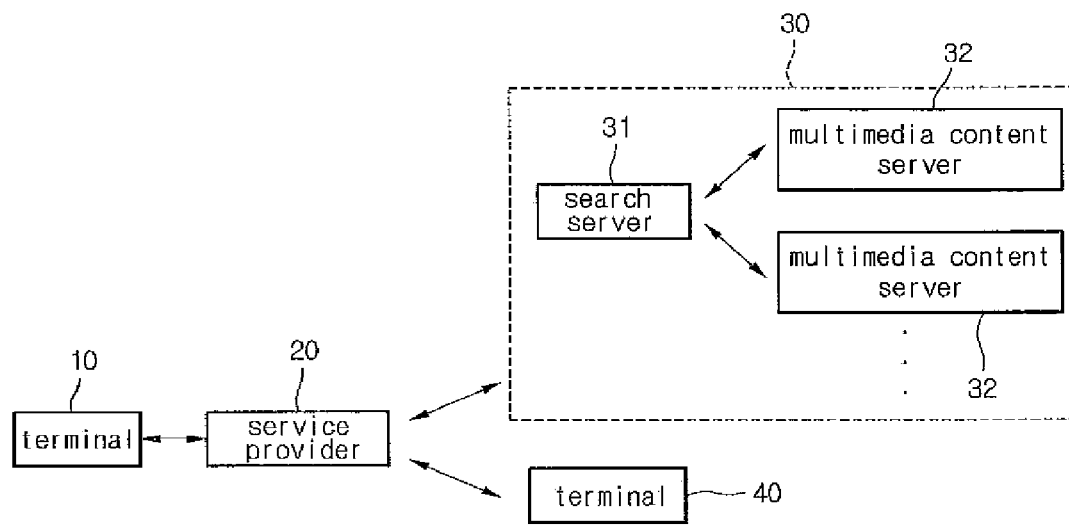
FIG. 1 is a block diagram illustrating a system for transmitting/receiving multimedia contents according to an embodiment of the present invention.

FIG. 1 is a block diagram illustrating a system for transmitting/receiving multimedia contents according to an embodiment of the present invention. As shown, the system includes terminals 10 and 40, a service provider 20 and a content providing server 30. The content providing server 30 includes a search server 31 connected to at least one multimedia content server 32. Further, the multimedia content server 32 stores multimedia contents.

In addition, the terminals 10 and 40 represent communication terminals such as a personal computer (PC) and a portable terminal, which can producer store, and output multimedia contents, access a server to register or delete multimedia contents, and download various multimedia contents registered in the server. The terminals 10 and 40 access the content providing server 30 to register and download required multimedia contents, and transmit or receive multimedia contents between the terminals 10 and 40. A service provider 20 is also provided and controls the terminals 10 and 40. The service provider 20 may also include multimedia contents that the users can access.

The following description refers to the terminal 10 that accesses and receives multimedia contents from the content providing server 30. Further, information about a category of the multimedia contents is set and transmitted to the content providing server 30. That is, the category information identifies various types of multimedia such as a film and music. Also, the category may include more detailed information such as a type of the film (drama, comedy, etc.), a type of music (e.g., classical music, pop music, etc.).

In addition, a specific ID such as a user ID may be used as the category information. Therefore, a user can simply transmit the category information to the content server 30 and the content server 30 searches and provides content information informing the user about multimedia contents that exist on the server 30. In addition, the content information is not the actually content itself, but is a snapshot of the multimedia content.

For example, the content information may be a thumbnail image (or a plurality of thumbnail images that are sequentially displayed). Thus, the user can view the thumbnail image and quickly determine the type of multimedia contents associated with the thumbnail image. Further, because the thumbnail image is transmitted to the terminal, rather than the actual multimedia contents, the amount of downloaded data is much less. Thus, the fees for downloading the content information are less then when actually downloading the actual multimedia contents.

In addition, when the user selects a particular thumbnail image, the user can then at that time download or view the actual multimedia contents. Therefore, the user can first view the thumbnail image, which represents a portion of the actual multimedia contents, before deciding whether he or she wants to download the actual multimedia contents. In addition, a users name or ID may also be displayed rather than a particular thumbnail image. Thus, a mobile terminal user can view multimedia contents provided by a plurality of other users, and quickly see the user ID or user's name to determine if they want to download contents corresponding the user ID or name.

Further, when the terminal 10 transmits the category information to the server 30 via the service provider 20, the search server 31 searches the multimedia content server 32 for multimedia contents that match the received category information. The content server 30 then transmits content information created from the searched multimedia contents to the transmission terminal 10. In addition, as shown in FIG. 1, the multimedia content server 32 may include one or a plurality of content servers.

Further, as discussed above, the content information includes predetermined information that allows a user to recognize the multimedia contents such as a thumbnail image created from the multimedia contents, a thumbnail image created from multimedia contents updated based on previously searched and stored multimedia contents, and a file name. Therefore, because the content information is transmitted rather than the actual content itself, the transmission load is less because the content information includes less data than the actual content.

In addition, the search server 31 performs a cash service to store information about the transmission terminal 10 connected to the content providing server 30 and category information received from the transmission terminal 10 in a database. The search server 31 also periodically connects to the multimedia content server 32 to determine the existence of updated multimedia contents using the database, thereby updating and storing content information that is then transmitted to the terminal 10.

Therefore, using the cash service, the search server 31 updates and stores multimedia contents in real time, and then transmits the latest updated information to the transmission terminal 10 when the transmission terminal 10 is connected to the search server 31. In addition, the content providing server 30 updates the database of the search server 31 if the category information received from the transmission terminal 10 is changed, and performs a cash service using the updated database, thereby transmitting updated multimedia content information to the terminal 10 whenever the terminal 10 is connected to the server 30 (e.g., when the terminal is powered on, when the user requests a connection to the server 30, periodically, etc.).

Further, the transmission terminal 10 outputs or displays content information received from the content providing server 30. In addition, when the user selects one item from the displayed content information, the terminal 10 transmits the request of multimedia contents corresponding to the selected item to the content providing server 30, and receives the multimedia contents from the content providing server 30.

For example, when the content information received from the server 30 is a thumbnail image, the terminal 10 displays the thumbnail image in a display window of the terminal 10. When the user selects the displayed thumbnail image, the contents related to the thumbnail image are downloaded to the terminal 10. Alternatively, the contents may be streamed to the terminal 10 without actually downloading the contents to the terminal 10.

In addition, the transmission terminal 10 may directly access a specific multimedia content server to receive content information that matches category information input or selected by the user on the terminal 10. In this instance, the multimedia content server connected to the transmission terminal 10 performs the cash service to maintain a history of requests that the user on the terminal 10 has performed.

In addition, the transmission terminal 10 can also transmit or request multimedia content information and contents from any other terminal such as the reception terminal 40. For example, when the transmission terminal 10 transmits category information for multimedia contents to the reception terminal 40, the reception terminal 40 creates content information that matches the category information and transmits the content information to the transmission terminal 10.

As discussed above, the content information includes predetermined information that allows a user to easily determine or recognize the type of multimedia contents such as a file name of the multimedia contents, a thumbnail image created from the multimedia contents, etc. The transmission terminal 10 also displays the content information on a display window. The user on the terminal 10 then selects one of the displayed content information. Then the terminal 10 requests the multimedia contents corresponding to the item selected from the content information from the reception terminal 40. The reception terminal 40 then transmits the requested multimedia contents to the transmission terminal 10.

In addition, a user on the transmission terminal 10 can access the content providing server 30 and the reception terminal 40 so as to directly search, select and receive multimedia contents. The terminal 40 may also access the server 30 and terminal 10 to retrieve desired multimedia contents.

Further, when the terminal 10 is transmitting/receiving multimedia contents from the server 30 or terminal 40, the terminal 10 displays status information about the transmitting/receiving process. For example, when the transmission terminal 10 registers multimedia contents to the server 30, the transmission terminal 10 transmits transmission status information so that the server 30 can effectively receive the multimedia contents according to the transmission status information of the terminal 10.

Similarly, when the transmission terminal 10 receives multimedia contents, the transmission terminal 10 transmits reception status information to the server 30 such that the server 30 can effectively transmit multimedia contents to the transmission terminal 10 based on the status information. The transmission/reception status information of the terminals may be transmitted to the service provider server 20 or to another terminal such as the terminal 40.

In addition, the transmission/reception status information of the terminals includes information about how many other terminal are currently connected to the terminal, how many contents have been transmitted/received, the resolution, a transmission rate, a transmission capacity, the number of other terminals that can be simultaneously connected to the terminal, and a reserved connection time.

Further, when multimedia contents are transmitted/received between terminals, transmission/reception status information of the transmission terminal 10 having requested the multimedia contents is also transmitted to the reception terminal 40 having received the request of the multimedia contents through the server 20, which connects the two terminals. When there are more than two terminals, the requesting terminal transmits the status information to the other terminals or to the terminal that the request is made. In addition, the receiving terminal classifies multimedia contents according to the resolution, the transmission capacity, or the transmission rate based on the status information to effectively provide the requested multimedia contents without an excessive transmission load.

In addition, a server or a predetermined terminal transmits content information using the status information transmitted from the transmitting terminal of the other party by inserting supportable information in the terminal that requested the multimedia contents into the content information. For example, supportable information such as "resolution is not supported" can be inserted into the content information according to the sent status information. The inserted supportable information may then be displayed on the requesting terminal such that a user can recognize the supportable information.

In addition, information transmitted/received between a terminal and a server, or between terminals is data having a structure including a control field and a data field. For example, the control and data fields for the category information may be about music or a film are formed, thereby constructing one data structure. The control field includes the category information, information about a user ID, and information related to the determination of the update of the category information including a date and a serial number, and additional information such as storage time and expiration time of a terminal.

The data field has information about the multimedia contents corresponding to the category information and the user ID included in the control field. Accordingly, updated category information, or updated content information can be determined using a data structure including the data field and the control field.

Thus, according to embodiments of the present invention, a user can conveniently receive multimedia contents and updated multimedia contents that match the category information set on the terminal. In addition, the multimedia contents are transmitted/received between a server and a terminal, or between terminals according to transmission/reception status information of a terminal, thereby effectively transmitting/receiving the multimedia contents without a transmission load.

Figure 2:
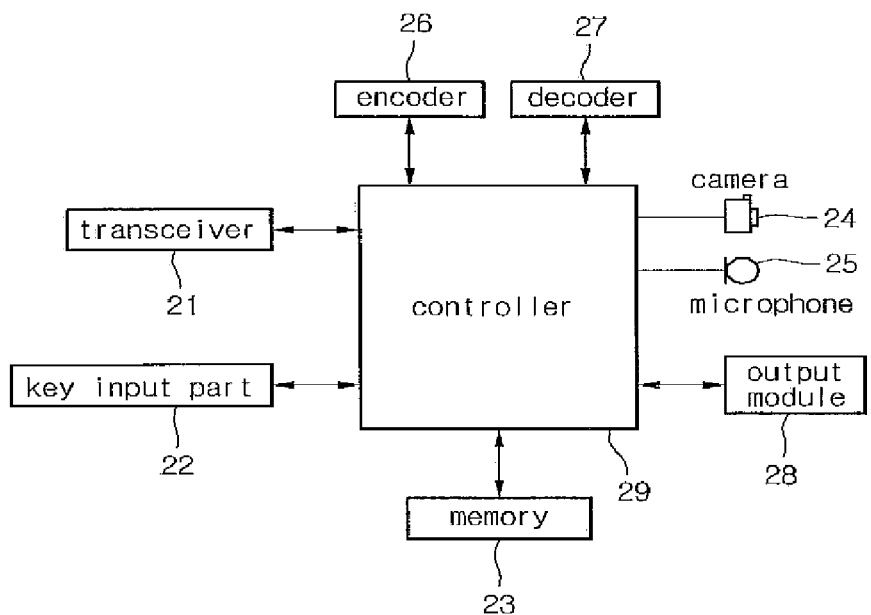
FIG. 2 is a block diagram illustrating a terminal according to an embodiment of the present invention.

Next, FIG. 2 is a block diagram illustrating a terminal according to an embodiment of the present invention. As shown, the terminal includes a transceiver 21 for transmitting/receiving category information, the status information of the terminal, and multimedia contents. Also included is a key input module 22 for setting the category information and the status information of the terminal, a memory 23 for storing the category information, the status information of the terminal, and the multimedia contents, and a camera 24 for receiving video data used to create the multimedia contents.

Also included is a microphone 25 for receiving audio data, an encoder 26 for encoding the multimedia contents, a decoder 27 for decoding the multimedia contents, an output module 28 for outputting the multimedia contents, and a controller 29 for controlling the transmission/reception of the multimedia contents according to the status information of the terminal. In addition, the transceiver 21 transmits the category information set in the terminal to the content providing server 30, receives content information matching with the category information and multimedia contents corresponding to the content information from the content providing server 30, and transmits transmission/reception status information about the terminal to the server 30 or another terminal via the service provider 20.

The key input module 22 includes a keypad and various buttons to input or set the category information and the status information of the terminal. Further, the key input module 22 receives a command from the user to select multimedia contents. In addition, the user can also use the input module to change the category information and the present status information of the terminal.

Also, the memory 23 stores the category information and the status information of the terminal, and is divided into a cache memory and a main memory. The cache memory stores content information received through the transceiver 21, and the main memory stores multimedia contents received when the user selects an item of content information, multimedia contents created in the terminal, category information set through the key input module 22, and status information of the terminal.

Further, the encoder 26 encodes multimedia contents created using video data and audio data input to the camera 24 and the microphone 25, and the encoded multimedia contents are transmitted to the server or the terminal of the other party through the transceiver 21. In addition, the decoder 27 decodes multimedia contents received through the transceiver 21 to display video data on a screen of the output module 28 and output audio data through a speaker.

The controller 29 controls each device of the terminal such that such that multimedia contents are transmitted/received using the status information and category information set in the terminal. The controller 29 also transmits category information to a content providing server through the transceiver 21 when the user selects a multimedia content menu, and receives content information matching the category information from the content providing server. When the content information corresponds to a thumbnail image, the thumbnail image is displayed on a screen of the terminal, and multimedia contents are received corresponding to the selected content information.

Further, the controller 29 transmits the transmission/reception status information of the terminal to a server or another terminal when the category information is transmitted, and performs a control operation such that the server or other terminal can effectively transmit/receive multimedia contents according to a resolution, a transmission capacity, and a transmission rate corresponding to the status information of the terminal.

The controller 29 also re-transmits category information set in the terminal to a server if the category information is changed or updated. In addition, when an update signal is received from the server, the controller 29 receives the content information in a background state so as not to negatively influence operations performed by the terminal, and stores the content information in the cache memory.

Further, the cache memory stores the content information received from the server according to received dates, thereby determining a history of previously received content information. In addition, multimedia contents received by selecting content information are stored in the main memory. Also, when the controller 29 receives content information including supportable information for the terminal, the controller 29 displays the content information together with the supportable information such that a user can recognize multimedia contents that can be output through the terminal.

In addition, according to embodiments of the present invention, the content information searched according to category information is received, multimedia contents corresponding to the selected content information are received, and a support state for the multimedia contents is determined such that the multimedia contents are effectively transmitted/received according to the status information of the terminal without individually selecting and downloading multimedia contents.

Further, if the category information is changed, the content information according to the changed category information is received. Also, if the content information searched according the category information is changed, the server transmits the content information to the terminal, thereby allowing a user to receive information about multimedia contents updated in real time.

Figure 3:
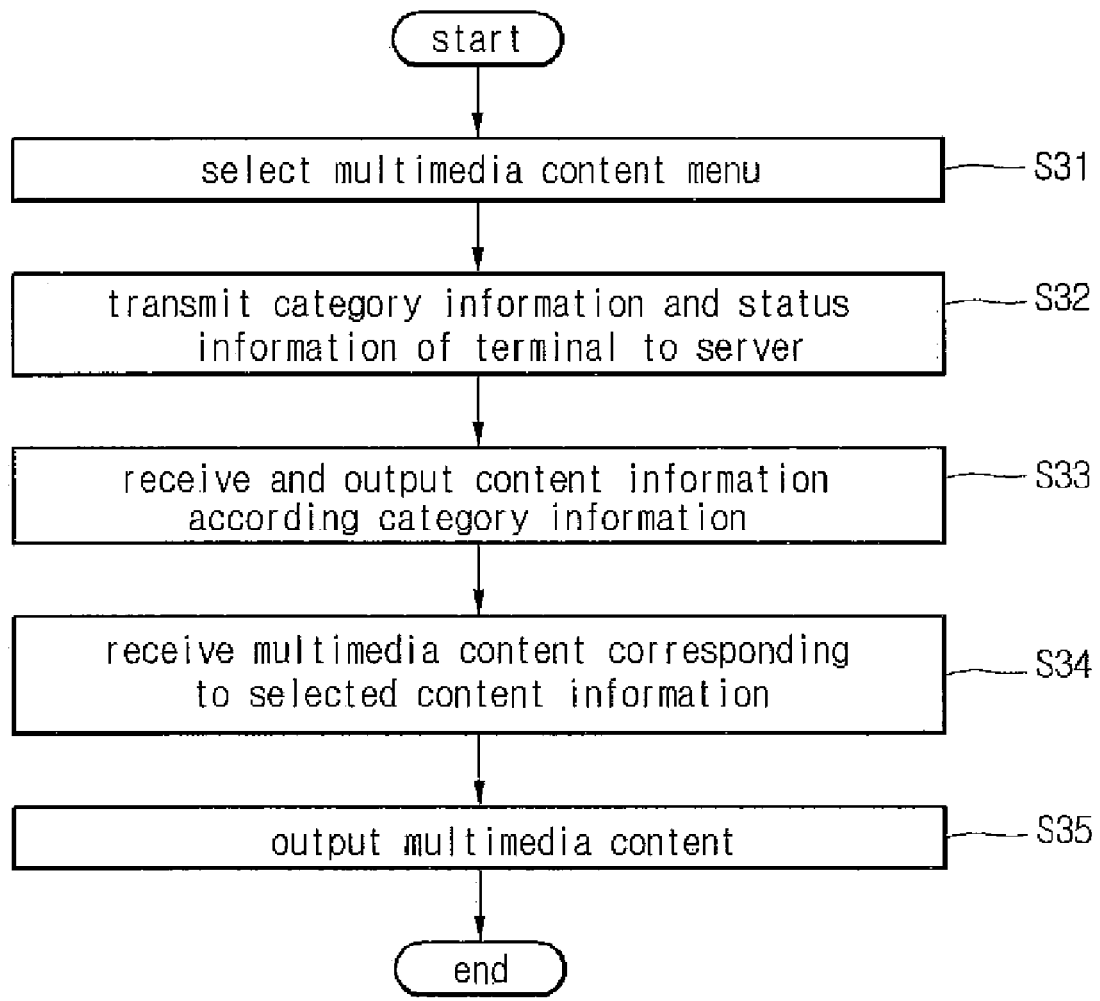
FIG. 3 is a flowchart illustrating a method for providing multimedia contents based on input category information according to an embodiment of the present invention.

Next, FIG. 3 is a flowchart illustrating a method for providing multimedia contents based on input category information according to an embodiment of the present invention. As shown, the user first selects a menu option for multimedia contents from a menu screen image of the terminal (S31), and the terminal transmits category information about the selected multimedia contents as well as status information about the terminal to the server (S32).

Figure 4:
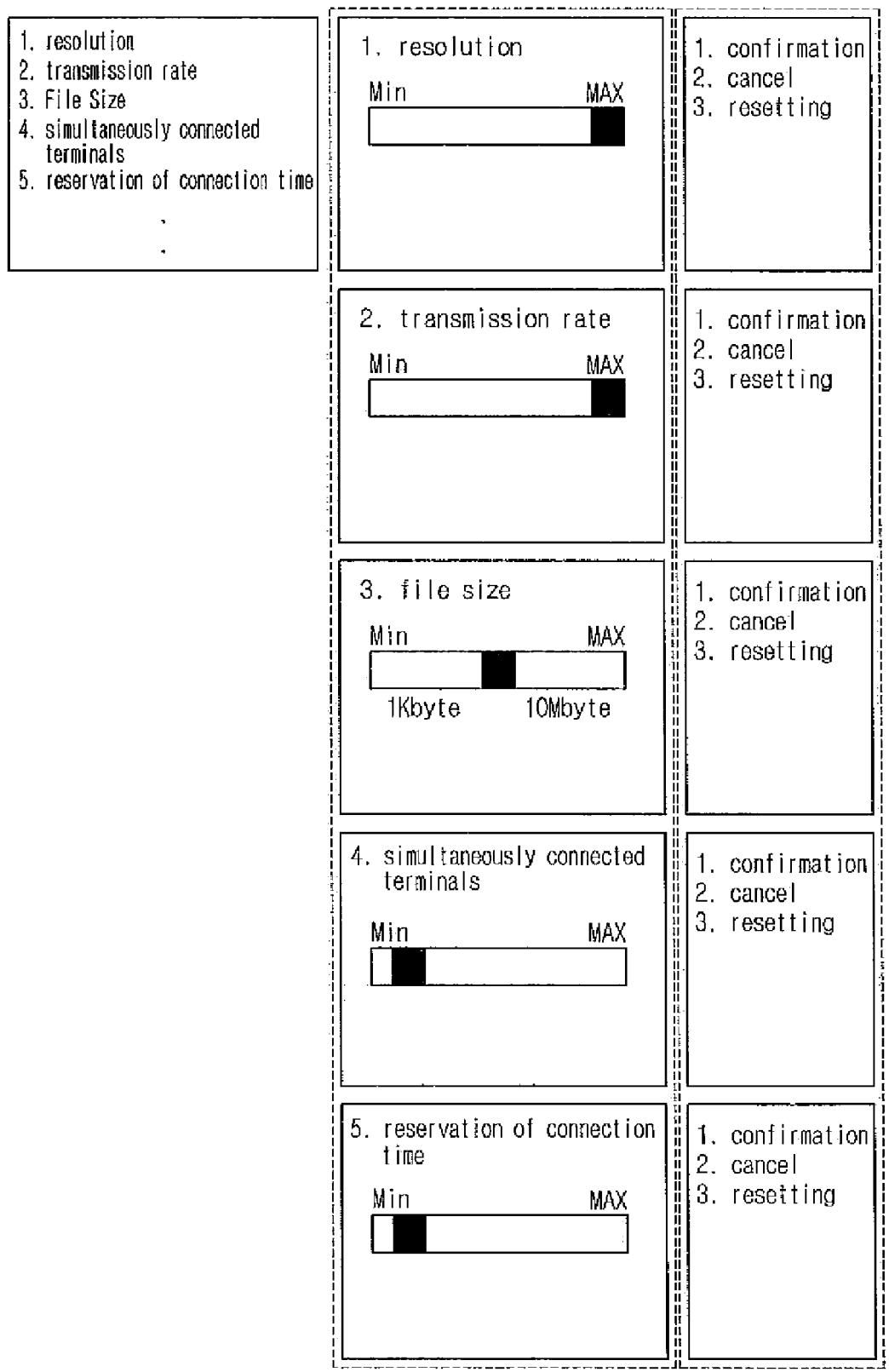
FIG. 4 is an overview illustrating detailed information of a terminal according to an embodiment of the present disclosure.

For example, as shown in FIG. 4, the status information about the terminal may be set and changed by a user. The set status information is then transmitted to the server or another terminal as the transmission/reception conditions of the terminal. As discussed above, the server may be the content providing server 30 or the service provider server 20 in FIG. 1.

As shown in FIG. 4, the status information of the terminal includes information about a resolution, a transmission rate, a file size, the number of other terminals that can be simultaneously connected to the terminal, and reservation of connection time. In addition, the status information is divided into transmission status information and reception status information of the terminal such that the user can set particular status information for both the transmission and reception processes.

In addition, the set category information can be changed. When the information is changed, the terminal retransmits the changed category information to the content providing server. Alternatively, the information can be retransmitted when the power of the terminal is turned on. The server then stores the category information transmitted from the terminal.

The content providing server also searches for multimedia contents that match the category information, and creates content information based on the searched multimedia contents. The content information may be predetermined information such as a file name of the multimedia contents and a thumbnail image created from the multimedia contents, enabling user to easily recognize the multimedia contents. The terminal then receives and outputs the content information transmitted from the server (step S33).

In addition, if the set category information is changed, the terminal retransmits the category information to the content providing server. Then, if an update signal for content information is received from the server, the terminal receives the content information and stores the content information in the memory in a background state. Further, content information transmitted from the server includes information about the support state for the multimedia contents of the terminal according to the status information of the terminal.

Figure 5:
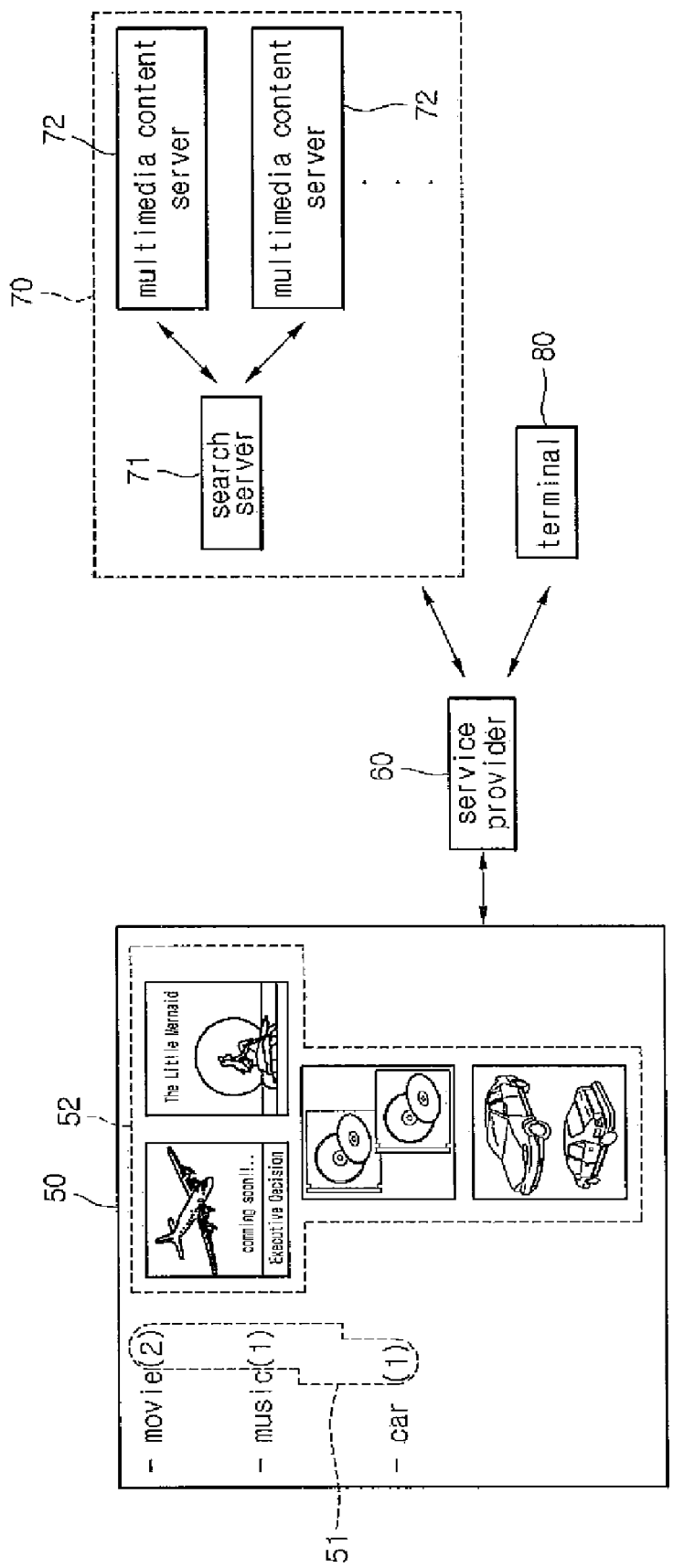
FIG. 5 is a block diagram illustrating category information of a terminal according to an embodiment of the present invention.

For example, as shown in FIG. 5, content information about set categories such as a film, music, and a new vehicle is displayed on a screen image 50 of the terminal. In addition, thumbnail images 52 having updated content information received from the content providing server and a number of updated thumbnail images (see the reference numeral 51) are displayed.

A search server 71 included in a content providing server 70 performs a cash service with respect to a multimedia content server 72 connected to the search server 71 and transmits updated content information to the terminal. The terminal then displays the updated content information such that a user recognizes the update state of the content information.

Figure 6:
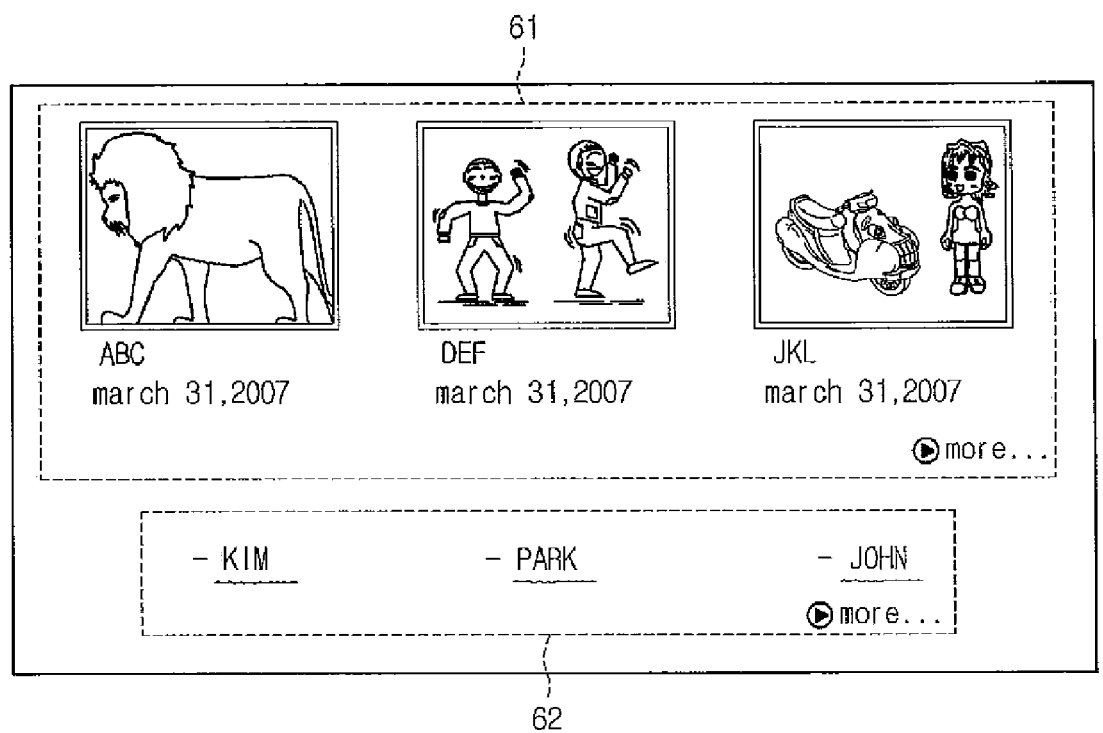
FIG. 6 is an overview illustrating category information according to an embodiment of the present invention.

According to another embodiment, as shown in FIG. 6, multimedia content information 61 according to category information and user IDs 62 are displayed on a screen image. When an item of the content information is selected, the corresponding multimedia contents are received and output on the terminal. Also, when one of the related user IDs 62 is selected, the content information corresponding to the selected user ID is output or displayed on the terminal.

In addition, in FIG. 3, the content information transmitted from the content providing server is received by the terminal and then displayed on a screen image of the terminal (S34 and S35). That is, the terminal requests the transmission of multimedia contents corresponding to an item selected from the received content information and then receives the multimedia contents (S34). The server effectively transmits the multimedia contents according to the status information of the terminal, and the terminal outputs the received multimedia contents (S35).

Figure 7:
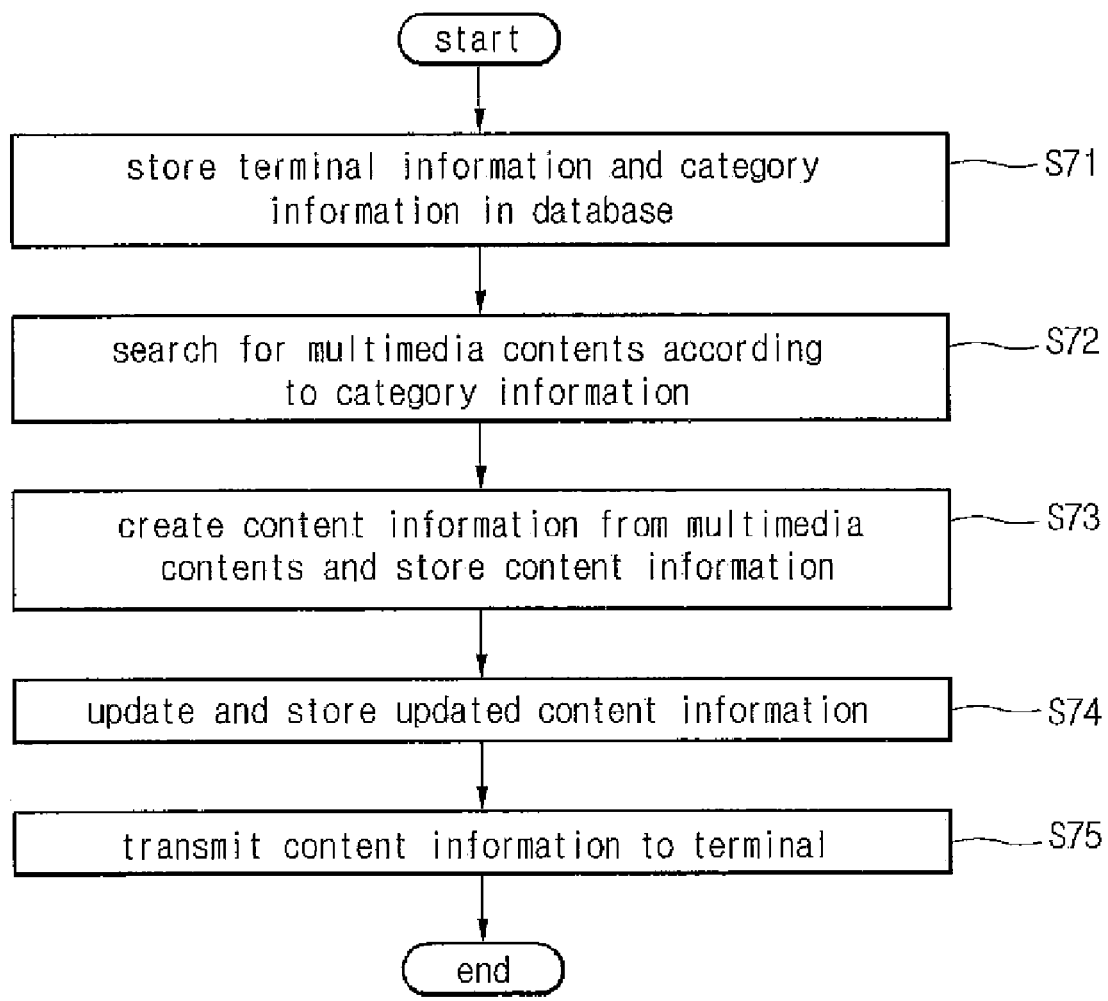
FIG. 7 is a flowchart illustrating a method for updating content information in a server according to an embodiment of the present invention.

Next, FIG. 7 is a flowchart showing a method of updating content information in a server according to an embodiment of the present application. As shown, the search server stores information about a terminal connected to the search server and category information transmitted from the terminal in a database (S71), and searches multimedia contents matching the category information in the multimedia content server (S72). In addition, the search server stores the status information of the terminal in the database if the status information of the terminal is transmitted.

In addition, the search server generates content information such as a thumbnail image from the searched multimedia contents and stores the content information (S73). The search server performs a cash service for updating and storing the content information when the updated multimedia content are searched (S74), and transmits the content information to the terminal (S75).

The search server changes category information stored in a database if the changed category information is received from a terminal, searches for multimedia contents using the changed category information, and performs the cash service, thereby transmitting the content information to the terminal.

According to embodiments of the present application, information about multimedia contents matching with category information and updated information about multimedia contents are provided. Therefore, the user does not have to search for multimedia content. In addition, the multimedia contents are transmitted/received between a server and a terminal, or between terminals according to the transmission/reception status information of the terminal, thereby effectively transmitting/receiving multimedia contents without negatively affecting a transmission load.

Further, information about multimedia contents according to changed category information, and information about multimedia contents updated according to the changed category information are provided in real time. In addition, the thumbnail images give the user an overall feeling for what the multimedia contents are. In addition, one thumbnail image may be displayed for a corresponding multimedia content, or a plurality of thumbnail images may be displayed.

For example, the plurality of thumbnail images may be displayed in a sequential or rolling manner, one after the other, to provide the user with an overall feel of what the multimedia contents include. The plurality of multimedia contents may also be displayed in a checkerboard pattern or any other pattern that gives the user an overall feeling about the multimedia contents include. That is, the content information includes one of a single still image thumbnail, a moving picture thumbnail, and a plurality of image thumbnails corresponding to different portions of the content As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of communicating on a mobile communication terminal, the method comprising:
receiving category information identifying a category of multimedia contents;
setting specific searching conditions identifying physical, reception, and transmission characteristics of the multimedia contents;
searching the multimedia contents based on the received category information and the setting specific searching conditions;
providing a list of content information of the searched multimedia contents on a server based on search results, wherein the content information is created by the server from the searched multimedia contents and the content information includes one of a segment of a multimedia content and a plurality of segments of the multimedia content corresponding to different sections of the multimedia content;
displaying the list of content information on the mobile communication terminal;
receiving a selection signal indicating a selection of at least one content information of the list of content information;
connecting to the multimedia content corresponding to said at least one of the selected content information,
wherein the content information includes an identification of a user indicating the multimedia contents that have been connected to by the identification of the user and that are available to be connected to by the mobile communication terminal;
displaying, on a screen image, one or more user identifications with the list of content information;
displaying specific content information corresponding to a specific user identification which is selected among the one or more user identifications; and
receiving the multimedia content provided by the user corresponding to the selected user identification.

2. The method of claim 1, further comprising:
connecting the mobile communication terminal to at least one other mobile communication terminal; and
transferring the multimedia contents corresponding to said at least one of the selected content information to said at least one other mobile communication terminal.

3. The method of claim 1, wherein the setting step includes: setting a resolution value for the multimedia contents to be searched.

4. The method of claim 1, wherein the setting step includes: setting a transmission rate value for the multimedia contents to be searched.

5. The method of claim 1, wherein the setting step includes: setting a file size value for downloading the multimedia contents to be searched.

6. The method of claim 1, wherein the setting step includes: setting a number of mobile communication terminals that can simultaneously connect to each other to receive selected multimedia content.

7. The method of claim 1, wherein the setting step includes: setting a reservation value corresponding to when the multimedia content corresponding to at least one selected multimedia content information is connected to.

8. The method of claim 1, further comprising:
storing the received category information and the setting specific searching conditions; and
notifying the mobile communication terminal when any updated multimedia contents related to the stored category information and the setting specific searching conditions are available.

9. The method of claim 1, wherein the content information includes one of a single still image thumbnail, a moving picture thumbnail, and a plurality of image thumbnails corresponding to different sections of the multimedia content.

10. A mobile communication terminal, comprising:
an input unit configured to receive category information identifying a category of multimedia contents and to set specific searching conditions identifying physical, reception, and transmission characteristics of the multimedia contents;
a transmitting unit configured to transmit the received category information and the set specific searching conditions to a server, wherein the server searches the multimedia contents corresponding to the received category information and the set specific searching conditions;
a receiving unit configured to receive a list of content information of the searched multimedia contents on the server based on searched results, wherein the content information is created by the server and the content information includes one of a segment of a multimedia content and a plurality of segments of the multimedia content corresponding to different sections of the multimedia content that the mobile communication terminal can connect to;
a display unit configured to display the list of the content information, one or more user identifications with the list of content information on a screen image, and specific content information corresponding to a user identification which is selected among the one or more user identifications; and
an output unit configured to output multimedia content corresponding to a selected one of the content information from the displayed list,
wherein the content information includes an identification of a user indicating the multimedia contents that have been connected to by the identification of the user and that are available to be connected to by the mobile communication terminal, and
the receiving unit is further configured to receive the multimedia content provided by a user corresponding to the selected user identification.

11. The mobile communication terminal of claim 10, wherein the output unit is further configured to transfer the multimedia contents corresponding to said one of the selected content information to at least one other mobile communication terminal.

12. The mobile communication terminal of claim 10, wherein the set specific searching conditions include setting a resolution value for the multimedia contents to be searched.

13. The mobile communication terminal of claim 10, wherein the set specific searching conditions include setting a transmission rate value for the multimedia contents to be searched.

14. The mobile communication terminal of claim 10, wherein the set specific searching conditions include setting a file size value for downloading the multimedia content to be searched.

15. The mobile communication terminal of claim 10, wherein the set specific searching conditions include setting a number of mobile communication terminals that can simultaneously connect to each other to receive selected multimedia contents.

16. The mobile communication terminal of claim 10, wherein the set specific searching conditions include setting a reservation value corresponding to when selected multimedia content is connected to.

17. The mobile communication terminal of claim 10, further comprising:
a memory unit configured to store the received category information and the set specific searching conditions; and
a notifying unit configured to notify the mobile communication terminal when any updated multimedia contents related to the stored category information and the set specific searching conditions are available.

18. The mobile communication terminal of claim 10, wherein the content information includes one of a single still image thumbnail, a moving picture thumbnail, and a plurality of image thumbnails corresponding to different sections of the multimedia content.

19. A mobile communication system, comprising:
a communication network;
at least one mobile communication terminal connected to the communication network; and
a multimedia content server connected to the communication network,
wherein the at least one mobile communication terminal includes an input unit configured to receive category information identifying a category of contents and to set specific searching conditions identifying physical, reception, and transmission characteristics of contents, a transmitting unit configured to transmit the received category information and the set specific searching conditions to a server, wherein the server searches the contents corresponding to the received category information and the set specific searching conditions, a receiving unit configured to receive a list of content information on the multimedia content server corresponding to the received category information and the set specific searching conditions, wherein the content information is created by the multimedia content server and the content information includes at least one of a segment of a content and a plurality of segments of the content corresponding to different sections of the content that the mobile communication terminal can connect to, a display unit configured to display the list of the content information, one or more user identifications with the list of content information on a screen image, and specific content information corresponding to a user identification which is selected among the one or more user identifications, and an output unit configured to output content corresponding to a selected one of the content information from the displayed list, and
wherein the content information includes an identification of a user indicating multimedia contents that have been connected to by the identification of the user and that are available to be connected to by the mobile communication terminal, and
the receiving unit is further configured to receive the multimedia contents provided by a user corresponding to the selected user identification.

20. The mobile communication system of claim 19, wherein the output unit is further configured to transfer the contents corresponding to said one of the selected content information to at least one other mobile communication terminal.

21. The mobile communication system of claim 19, wherein the set specific searching conditions include setting a resolution value for the content to be searched, a transmission rate value for the content to be searched, a file size value for downloading the content to be searched, a number of mobile communication terminals that can simultaneously connect to each other to receive the selected content information, and a reservation value corresponding to when the content corresponding to said one of the selected content information is connected to.

22. The mobile communication system of claim 19, wherein the multimedia content server notifies the at least one mobile communication terminal when any updated contents related to stored category information and the set specific searching conditions are available.

23. The mobile communication system of claim 19, wherein the content information includes one of a single still image thumbnail, a moving picture thumbnail, a plurality of image thumbnails corresponding to different sections of the content.

* * * * *